(12) United States Patent
Chono et al.

(10) Patent No.: US 9,896,874 B2
(45) Date of Patent: Feb. 20, 2018

(54) LIFTING AND LOWERING APPARATUS

(71) Applicant: AISIN SEIKI KABUSHIKI KAISHA, Kariya-shi, Aichi (JP)

(72) Inventors: Katsumi Chono, Hekinan (JP); Shigeyuki Suzuki, Kariya (JP); Hidefumi Katayama, Anjo (JP); Hirokazu Suzumura, Aichi-ken (JP); Takayuki Ueno, Toyoake (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/313,317

(22) PCT Filed: Jun. 8, 2015

(86) PCT No.: PCT/JP2015/066519
§ 371 (c)(1),
(2) Date: Nov. 22, 2016

(87) PCT Pub. No.: WO2015/198849
PCT Pub. Date: Dec. 30, 2015

(65) Prior Publication Data
US 2017/0191302 A1  Jul. 6, 2017

(30) Foreign Application Priority Data

Jun. 23, 2014 (JP) ................ 2014-128237

(51) Int. Cl.
*E05F 11/48* (2006.01)
*E05F 15/689* (2015.01)
(Continued)

(52) U.S. Cl.
CPC ............ *E05F 15/689* (2015.01); *B60J 1/17* (2013.01); *E05D 15/165* (2013.01);
(Continued)

(58) Field of Classification Search
CPC ..... E05F 15/689; E05F 11/382; E05F 11/483; E05D 15/165; B60J 1/17
See application file for complete search history.

(56) References Cited

U.S. PATENT DOCUMENTS 6,227,993 B1  5/2001  Medebach
6,574,922 B2 * 6/2003  Velthaus ............... E05F 15/689
                                                          296/146.7
(Continued)

FOREIGN PATENT DOCUMENTS

DE  20 2010 002 223 U1  6/2011
JP  02-81893  6/1990
(Continued)

OTHER PUBLICATIONS

Machine translation of Brose (DE 20 2010 002 223), retrieved from https://worldwide.espacenet.com/publicationDetails/biblio?CC=DE&NR=202010002223U1&KC=U1&FT=D&ND=5&date=20110609&DB=&locale=en_EP.*
(Continued)

*Primary Examiner* — Katherine W Mitchell
*Assistant Examiner* — Abe Massad
(74) *Attorney, Agent, or Firm* — Buchanan Ingersoll & Rooney PC

(57) ABSTRACT

A lifting and lowering apparatus includes a support plate, a carrier for lifting and lowering a window glass and a drive mechanism for moving the carrier. The drive mechanism includes a cable, a drum, a pulley and a bracket for mounting the pulley to the support plate. The support plate is provided with first and second fixing portions. The first fixing portion is arranged at an outer side of the cable and the second fixing portion is arranged at an inner side of the cable. The bracket includes first and second mounting portions provided for the first and second fixing portions respectively. The first mounting portion includes a first extension portion making contact (Continued)

with an outer surface of the first fixing portion and the second mounting portion includes a second arm portion making contact with an inner surface of the second fixing portion.

14 Claims, 10 Drawing Sheets

(51) Int. Cl.
*E05D 15/16* (2006.01)
*B60J 1/17* (2006.01)

(52) U.S. Cl.
CPC ... *E05Y 2201/646* (2013.01); *E05Y 2201/654* (2013.01); *E05Y 2600/46* (2013.01); *E05Y 2900/55* (2013.01)

(56) References Cited

U.S. PATENT DOCUMENTS

| | | | |
|---|---|---|---|
| 7,958,676 B2* | 6/2011 | Kruger | B60J 1/17 49/352 |
| 2014/0165471 A1 | 6/2014 | Chono et al. | |
| 2014/0179475 A1* | 6/2014 | Fukumoto | E05F 11/483 474/166 |
| 2015/0191957 A1* | 7/2015 | Takeda | E05F 11/483 49/352 |
| 2015/0275560 A1* | 10/2015 | Yamamoto | E05F 11/488 49/352 |

FOREIGN PATENT DOCUMENTS

| | | | |
|---|---|---|---|
| JP | 2000-186461 A | 7/2000 | |
| JP | 2001-049949 A | 2/2001 | |
| JP | 2014020005 A * | 2/2014 | ............ E05F 11/483 |
| WO | WO 2011/095414 A1 | 8/2011 | |
| WO | WO 2013/065721 A1 | 5/2013 | |

OTHER PUBLICATIONS

English language translation of International Preliminary Report on Patentability (Forms PCT/IB/373 and PCT/ISA/237), with Written Opinion, dated Dec. 27, 2016, by the International Bureau of WIPO in corresponding International Application No. PCT/JP2015/066519. (9 pages).

International Search Report (PCT/ISA/210) dated Aug. 25, 2015, by the Japan Patent Office as the International Searching Authority for International Application No. PCT/JP2015/066519.

Written Opinion (PCT/ISA/237) dated Aug. 25, 2015, by the Japan Patent Office as the International Searching Authority for International Application No. PCT/JP2015/066519.

* cited by examiner

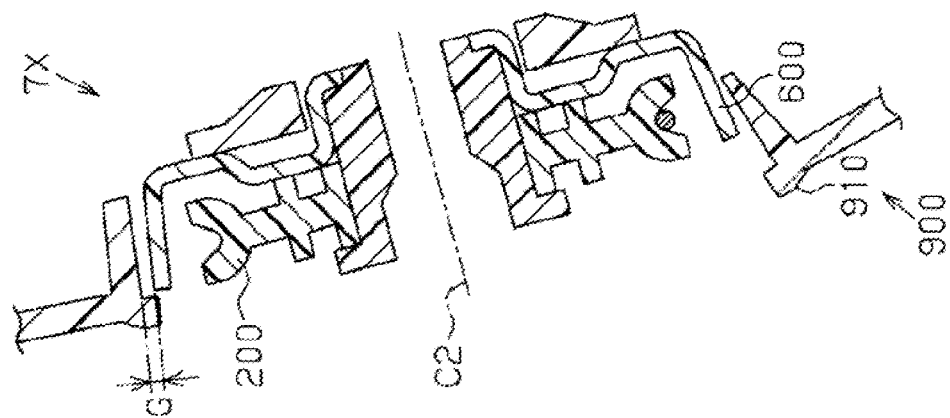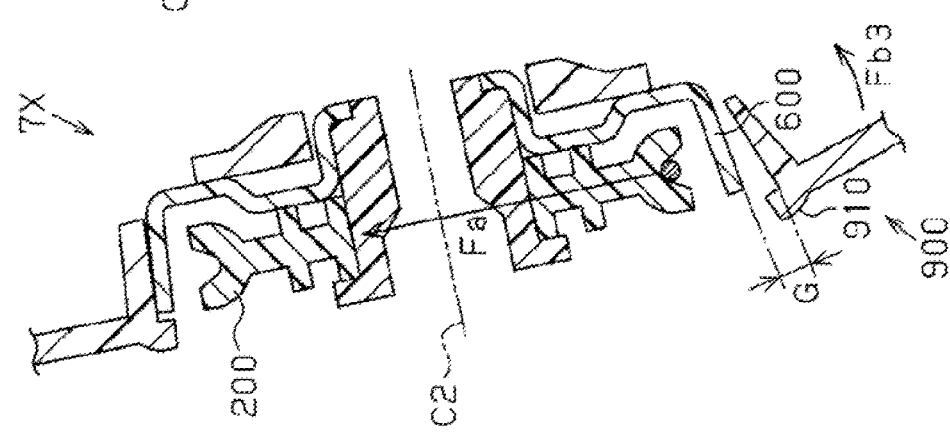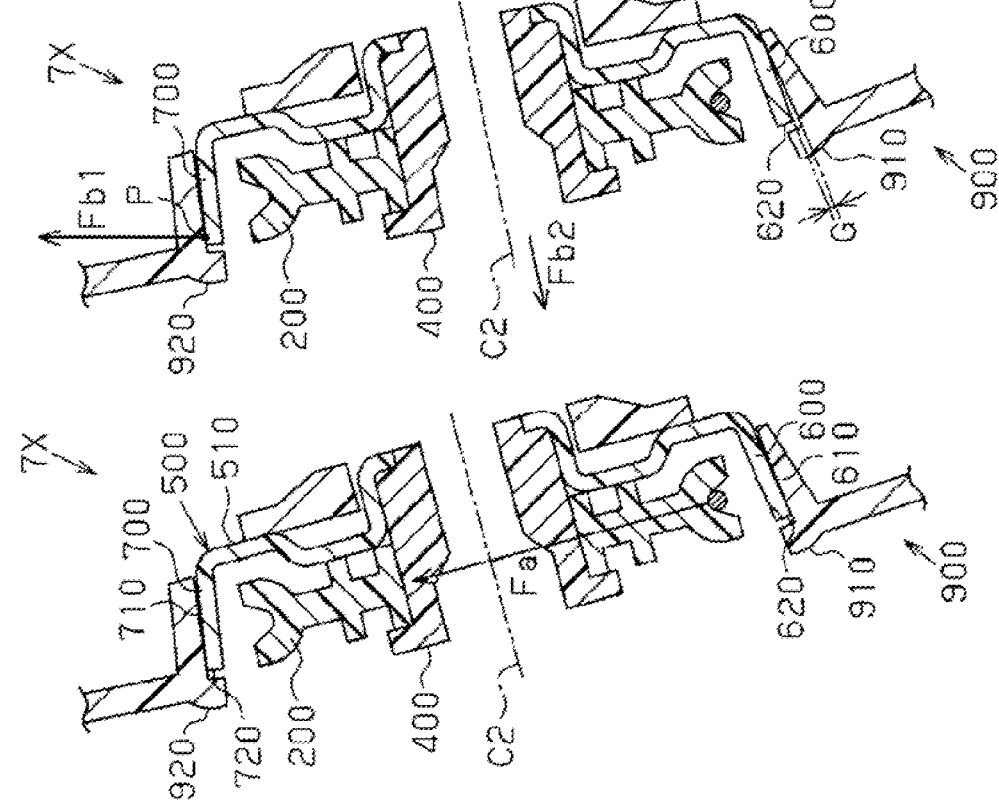

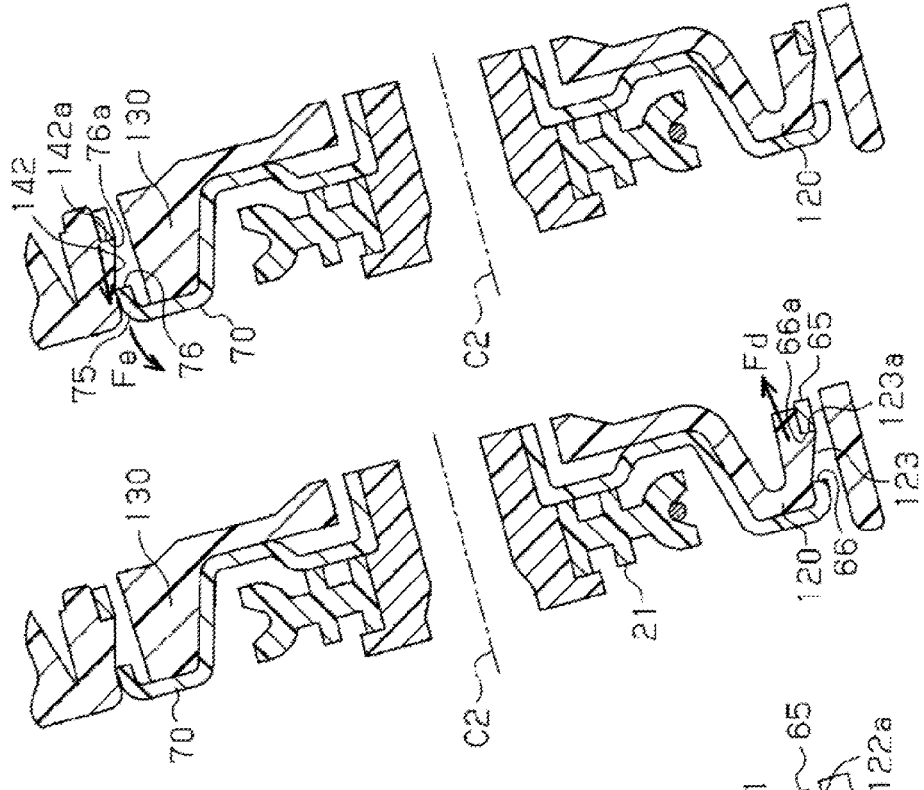

F I G. 14
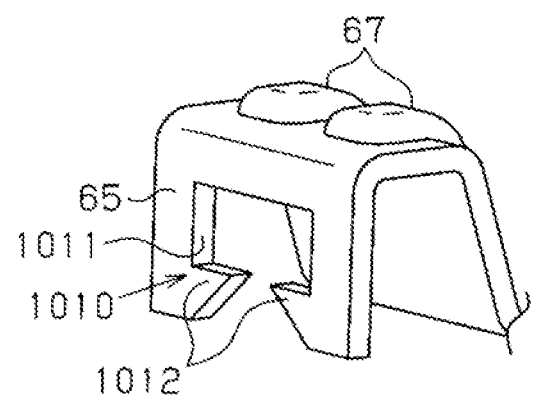

F I G. 15
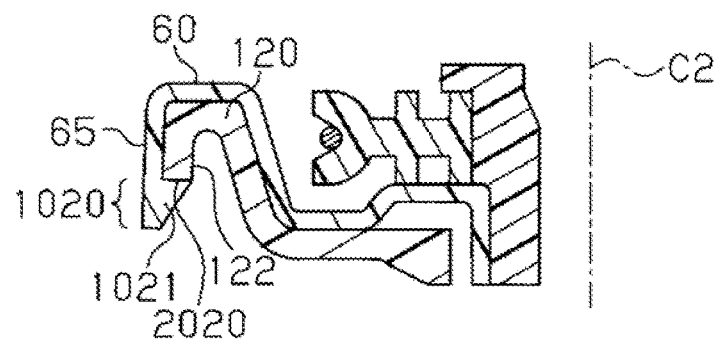
F I G. 16
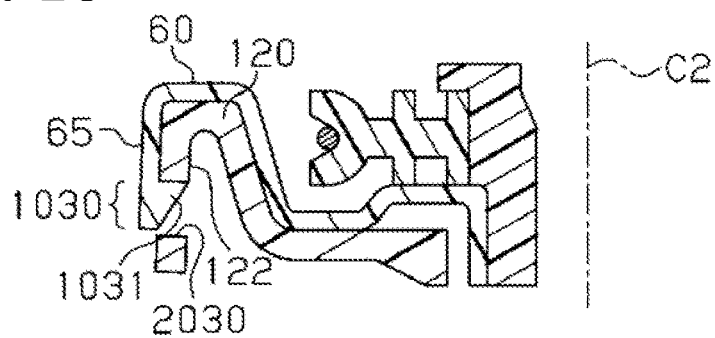
F I G. 17
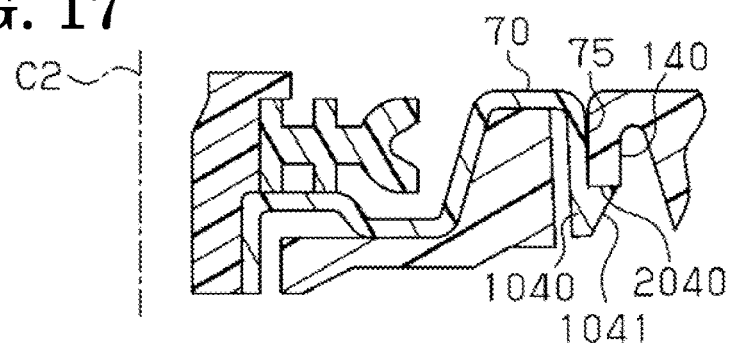
F I G. 18
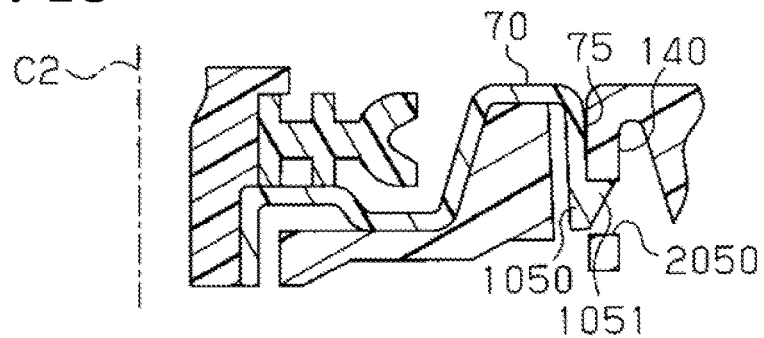

LIFTING AND LOWERING APPARATUS

TECHNICAL FIELD

The present invention relates to a lifting and lowering apparatus lifting and lowering a window glass for a vehicle.

BACKGROUND ART

Patent document 1 discloses a lifting and lowering apparatus for lifting and lowering a window glass mounted to a side door of a vehicle. The lifting and lowering apparatus disclosed in Patent document 1 includes a support plate, a carrier which lifts and lowers the window glass and a drive mechanism which moves the carrier. The carrier is provided at the support plate to be movable thereto.

The drive mechanism includes a drum rotating by power of a motor, a cable pulled by the drum and a pulley guiding the cable. The pulley is mounted to the support plate via a bracket. The bracket includes two mounting portions. Fixing portions are provided at the support plate. The bracket is fixed to the support plate in a state where the mounting portions engage with the fixing portions.

The motor is in a rotationally driven state at the instant the window glass is stopped in a fully open state or in a fully closed state. Thus, a large tensile force is applied to the cable. At this time, a portion of the tensile force is applied to the bracket via the pulley. A portion of the force applied to the bracket functions to rotate the bracket about one end thereof serving as a support point. As a result, in a case where the force applied to the bracket becomes excessive, there is a concern that the bracket disengages from the support plate.

DOCUMENT OF PRIOR ART

Patent Document

Patent document 1: DE202010002223U

OVERVIEW OF INVENTION

Problem to be Solved by Invention

An object of the present invention is to provide a lifting and lowering apparatus which restrains disengagement of a bracket from a support plate.

Means for Solving Problem

In order to solve the aforementioned drawback, a lifting and lowering apparatus lifting and lowering a window glass and including a support plate, a carrier movably provided at the support plate for lifting and lowering the window glass and a drive mechanism for moving the carrier is provided. The drive mechanism includes a cable connected to the carrier, a drum pulling the cable, a pulley guiding the cable and a bracket for mounting the pulley to the support plate. The support plate is provided with a pulley arrangement portion at which the pulley is arranged and first and second fixing portions arranged at respective sides of the pulley arrangement portion. The first fixing portion is arranged at an outer side of the cable and the second fixing portion is arranged at an inner side of the cable. The bracket includes a body portion at which the pulley is arranged, a first mounting portion mounted to the first fixing portion and a second mounting portion mounted to the second fixing portion. The first mounting portion includes a first arm portion extending from the body portion and a first extension portion extending from the first arm portion and making contact with an outer surface of the first fixing portion. The second mounting portion includes a second arm portion extending from the body portion and making contact with an inner surface of the second fixing portion.

BRIEF DESCRIPTION OF DRAWINGS

FIG. 12A is a cross-sectional view illustrating a state where a tensile force is applied to a pulley in a pulley unit of a reference example;

FIG. 12B is a cross-sectional view illustrating an example of a change mode of the pulley unit;

FIG. 12C is a cross-sectional view illustrating another example of the change mode of the pulley unit;

FIG. 12D is a cross-sectional view illustrating still another example of the change mode of the pulley unit;

FIG. 13A is a cross-sectional view illustrating a state where a tensile force is applied to a pulley in the pulley unit according to an embodiment;

FIG. 13B is a cross-sectional view illustrating an example of a change mode of the pulley unit;

FIG. 13C is a cross-sectional view illustrating another example of the change mode of the pulley unit;

FIG. 13D is a cross-sectional view illustrating still another example of the change mode of the pulley unit;

FIG. 14 is a perspective view of the first mounting portion according to another embodiment of the first mounting portion;

FIG. 15 is a cross-sectional view illustrating an engagement structure of the first mounting portion and a first fixing portion according to still another embodiment of the first mounting portion;

FIG. 16 is a cross-sectional view illustrating the engagement structure of the first mounting portion and the first fixing portion according to still another embodiment of the first mounting portion;

FIG. 17 is a cross-sectional view illustrating the engagement structure of a second mounting portion and a second fixing portion according to another embodiment of the second mounting portion; and FIG. 18 is a cross-sectional view illustrating the engagement structure of the second mounting portion and the second fixing portion according to still another embodiment of the second mounting portion.

MODE FOR CARRYING OUT THE INVENTION

Figure 1:
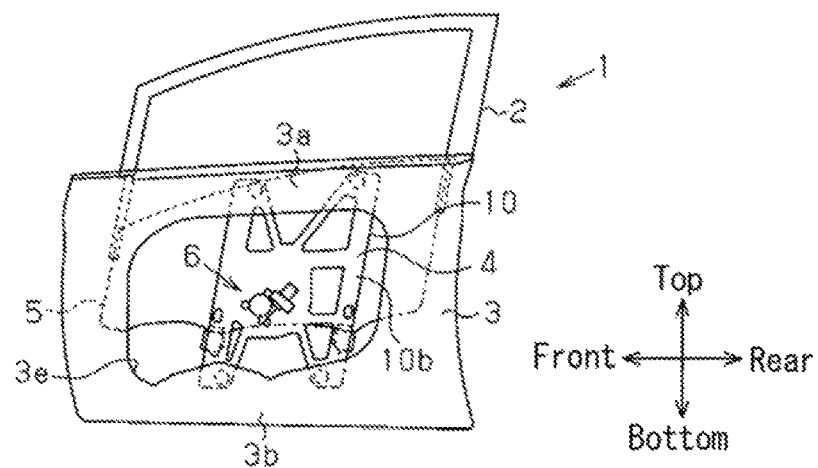
FIG. 1 is a schematic view of a side door viewed from an inner side.

A lifting and lowering apparatus mounted to a side door of a vehicle is explained with reference to FIGS. 1 to 18. As illustrated in FIG. 1, a side door 1 of a vehicle includes an outer panel 2 constituting an outer side of the side door 1, an inner panel 3 constituting an inner side of the side door 1, a lifting and lowering apparatus 4 disposed between the outer panel 2 and the inner panel 3 and a window glass 5 lifted and lowered by the lifting and lowering apparatus 4. A motor unit 6 for driving the lifting and lowering apparatus 4 is mounted to the lifting and lowering apparatus 4.

An opening portion 3e is provided at a center of the inner panel 3 for assembly of components. The lifting and lowering apparatus 4 is mounted to an outer surface of the inner panel 3. An upper portion of the lifting and lowering apparatus 4 is fastened to an upper side portion 3a of the inner panel 3, i.e., an upper side portion of the opening portion 3e in the inner panel 3, via a fastening member such as a bolt, for example. A lower portion of the lifting and lowering apparatus 4 is fastened to a lower side portion 3b of the inner panel 3, i.e., a lower side portion of the opening portion 3e in the inner panel 3, via a fastening member such as a bolt, for example.

In the following explanation, an inner side or an inner surface of the lifting and lowering apparatus 4 indicates a seat side or a surface of the seat side in a state where the lifting and lowering apparatus 4 is mounted to the side door 1. An outer side or an outer surface of the lifting and lowering apparatus 4 indicates an outer side or a surface of the outer side in a state where the lifting and lowering apparatus 4 is mounted to the side door 1.

A front side of the lifting and lowering apparatus 4 indicates a front side in a state where the lifting and lowering apparatus 4 is mounted to the side door 1. A rear side of the lifting and lowering apparatus 4 indicates a rear side in a state where the lifting and lowering apparatus 4 is mounted to the side door 1. A front indicates a forward direction of the vehicle in a state where the lifting and lowering apparatus 4 is mounted to the side door 1. A rear indicates a rearward direction of the vehicle in a state where the lifting and lowering apparatus 4 is mounted to the side door 1.

An upper side or an upper portion of the lifting and lowering apparatus 4 indicates an upper side or a portion of the upper side in a state where the lifting and lowering apparatus 4 is mounted to the side door 1. A lower side or a lower portion of the lifting and lowering apparatus 4 indicates a lower side or a portion of the lower side in a state where the lifting and lowering apparatus 4 is mounted to the side door 1.

Figure 2:
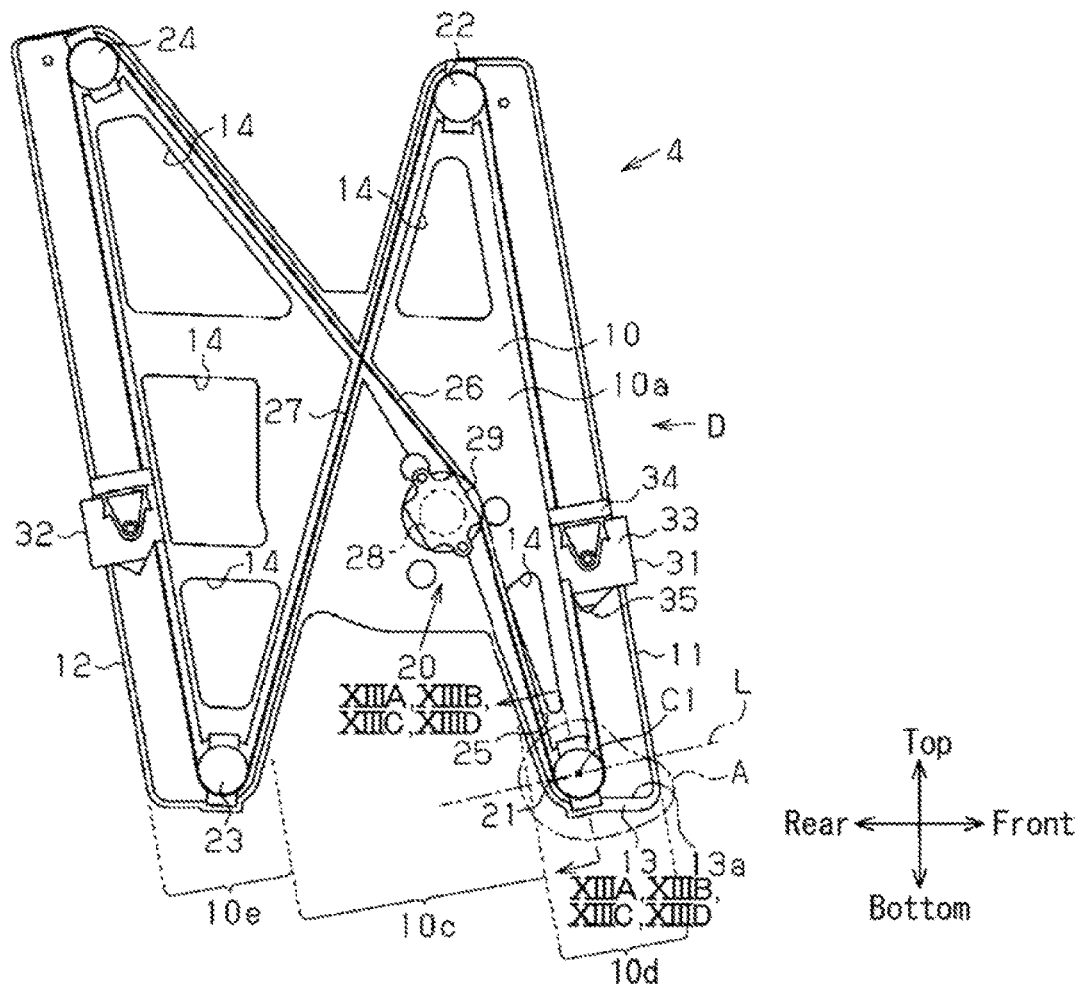
FIG. 2 is a schematic view of a lifting and lowering apparatus viewed from an outer side.
Figure 3:
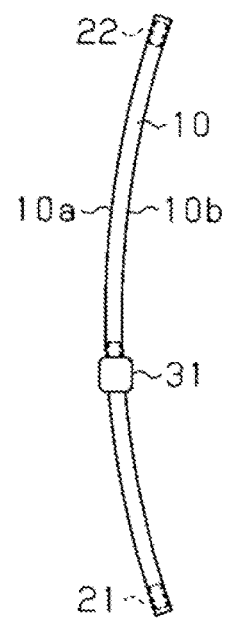
FIG. 3 is a schematic view of the lifting and lowering apparatus viewed from an arrow D direction in FIG. 2.

As illustrated in FIG. 2, the lifting and lowering apparatus 4 includes a drive mechanism 20 which drives the window glass 5 to be lifted and lowered, a support plate 10 supporting the drive mechanism 20 and two carriers 31, 32 which are lifted and lowered by power of the drive mechanism 20. The carriers 31 and 32 are slidably mounted to the support plate 10. In the following, the carrier arranged at the front side of the lifting and lowering apparatus 4 is referred to as the first carrier 31 while the carrier arranged at the rear side of the lifting and lowering apparatus 4 is referred to as the second carrier 32.

The support plate 10 is configured to extend along the window glass 5. For example, in a case where the window glass 5 is curved to expand to the outer side, the support plate 10 is configured to expand to the outer side as illustrated in FIG. 2. That is, the support plate 10 is configured so that a gap distance between the window glass 5 and the support plate 10 is maintained to be constant in a case where the window glass 5 that is curved moves upward and downward. The support plate 10 is made of, for example, resin. Several opening portions 14 are provided at the support plate 10 for improving formability.

The support plate 10 includes a front side portion 10d, a rear side portion 10e and a center portion 10c disposed between the front side portion 10d and the rear side portion 10e. The front side portion 10d extends in an up-down direction in a state being arranged at a front portion of the support plate 10. The rear side portion 10e extends in the up-down direction in a state being arranged at a rear portion of the support plate 10. The support plate 10 includes a first guide rail 11 at a front side of the front side portion 10d for guiding the first carrier 31. The support plate 10 includes a second guide rail 12 at a rear side of the rear side portion 10e for guiding the second carrier 32.

The first and second guide rails 11 and 12 are integrally formed with the support plate 10. The first and second guide rails 11 and 12 extend in parallel to or substantially in parallel to each other. The first and second guide rails 11 and 12 extend obliquely relative to a lifting and lowering direction of the window glass 5. That is, the first and second guide rails 11 and 12 are oblique relative to a vertical direction in a state where the lifting and lowering apparatus 4 is mounted to the side door 1.

The support plate 10 includes a stopper 13 at a lower end of the front side portion 10d for restricting a movement of the first carrier 31. The stopper 13 includes a contact surface 13a disposed at a lower side of a rotation axis C1 of a first pulley 21 which is explained later. A contact portion 35 of the first carrier 31 makes contact with the contact surface 13a. The lower side of the rotation axis C1 of the first pulley 21 corresponds to a lower side of an imaginary line L orthogonal to the rotation axis C1 and the first guide rail 11.

The drive mechanism 20 is provided at an outer surface 10a of the support plate 10. As illustrated in FIG. 1, the motor unit 6 is disposed at an inner surface 10b of the support plate 10 for driving the drive mechanism 20. The motor unit 6 includes a reducer and a gear mechanism, for example. Power output from an output shaft of the reducer or the gear mechanism (hereinafter referred to as a "motor output shaft") is transmitted to the drive mechanism 20. The motor output shaft protrudes to the outer surface 10a of the support plate 10 by inserting a bore which penetrates through the support plate 10. The first carrier 31 is slidably mounted to the first guide rail 11. The second carrier 32 is slidably mounted to the second guide rail 12. The first carrier 31 includes a carrier bracket 33 mounted to the first guide rail 11, a holder 34 mounted to the carrier bracket 33 for holding the window glass 5 and the contact portion 35 which makes contact with the stopper 13. The contact portion 35 is formed by a buffer member made of resin or rubber. The second carrier 32 includes a similar configuration to the first carrier 31 except that the second carrier 32 does not include the contact portion 35.

The drive mechanism 20 includes three cables (which are hereinafter referred to as a "first cable 25", a "second cable 26" and a "third cable 27"), a drum 28 pulling the first and second cables 25, 26 and four pulleys (which are hereinafter referred to as the "first pulley 21", a "second pulley 22", a "third pulley 23" and a "fourth pulley 24") guiding the first to third cables 25 to 27. The drum 28 is housed in a housing portion 29 which is disposed at a center of the support plate 10. The drum 28 is connected to the motor output shaft of the motor unit 6 so as to rotate by the driving of the motor unit 6.

The first to fourth pulleys 21 to 24 are mounted to the support plate 10 so as to be rotatable thereto in the following manner. The first pulley 21 is mounted to a lower portion of the front side portion 10d of the support plate 10. The second pulley 22 is mounted to an upper portion of the front side portion 10d of the support plate 10. The third pulley 23 is mounted to a lower portion of the rear side portion 10e of the support plate 10. The fourth pulley 24 is mounted to an upper portion of the rear side portion 10e of the support plate 10.

The first cable 25 connects a lower end portion of the first carrier 31 and the drum 28 to each other. Specifically, one end of the first cable 25 is connected to the lower end of the first carrier 31. The first cable 25 is pulled downward at the lower end of the first carrier 31 and is folded upward by the first pulley 21 at an intermediate portion of the first cable 25. The other end of the first cable 25 is connected to the drum 28.

The second cable 26 connects an upper end of the second carrier 32 and the drum 28 to each other. Specifically, one end of the second cable 26 is connected to the upper end of the second carrier 32. The second cable 26 is pulled upward at the upper end of the second carrier 32 and is folded downward by the fourth pulley 24 at an intermediate portion of the second cable 26. The other end of the second cable 26 is connected to the drum 28.

The third cable 27 connects the first carrier 31 and the second carrier 32 to each other. Specifically, one end of the third cable 27 is connected to an upper end of the first carrier 31. The third cable 27 is pulled upward at the upper end of the first carrier 31 and is folded downward at a portion between one end of the third cable 27 and an intermediate portion thereof. The third cable 27 is folded upward by the third pulley 23 at a portion between the other end of the third cable 27 and the intermediate portion thereof. The other end of the third cable 27 is connected to a lower end of the second carrier 32.

Next, an operation of the drive mechanism 20 is explained with reference to FIG. 2. As illustrated in FIG. 2, the drum 28 rotates so as to wind the first cable 25 in the drum 28. A rotation direction of the drum 28 at this time is referred to as a "first direction". The first carrier 31 thus moves downward. In association with the downward movement of the first carrier 31, the third cable 27 is pulled. Thus, the second carrier 32 also moves downward with the movement of the first carrier 31. That is, based on the rotation of the drum 28 in the first direction, the first carrier 31 and the second carrier 32 move downward by the same distances as each other.

The drum 28 rotates so as to wind the second cable 26 in the drum 28. The rotation direction of the drum 28 at this time is referred to as a "second direction". The second carrier 32 thus moves upward. In association with the upward movement of the second carrier 32, the third cable 27 is pulled. Thus, the first carrier 31 moves upward with the movement of the second carrier 32. That is, based on the rotation of the drum 28 in the second direction, the first carrier 31 and the second carrier 32 move upward by the same distances as each other.

Figure 4:
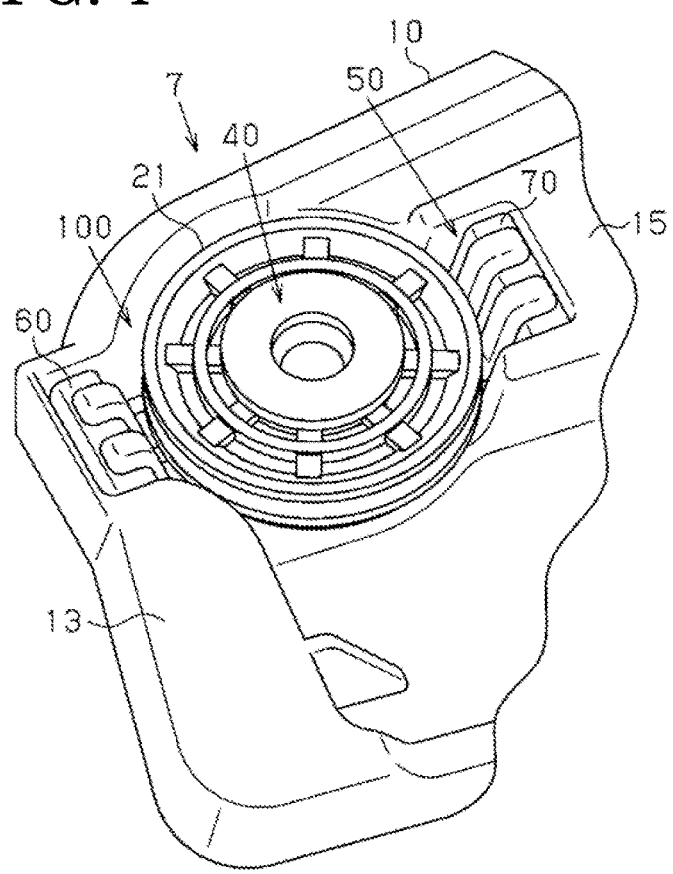
FIG. 4 is an enlarged view of a portion A in FIG. 2.

Next, a mounting construction of the first pulley 21 is explained with reference to FIGS. 4 to 18. A mounting construction of each of the second to fourth pulleys 22 to 24 is similar to the mounting construction of the first pulley 21. As illustrated in FIG. 4, the first pulley 21 is mounted to a bracket 50 via a shaft member 40. The first pulley 21, the shaft member 40 and the bracket 50 constitute a single unit (which is hereinafter referred to as a "pulley unit 7"). The pulley unit 7 is mounted to a pulley unit mounting portion 100 of the support plate 10.

Figure 5:
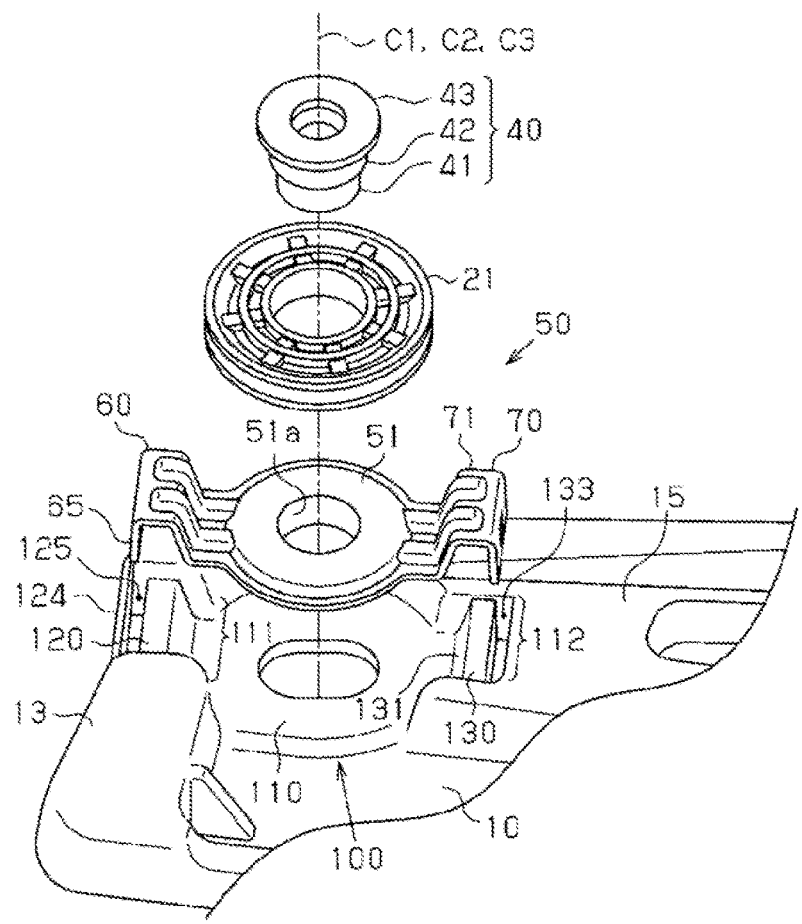
FIG. 5 is an exploded view of a pulley unit.

As illustrated in FIG. 5, the first pulley 21 includes an annular configuration. A groove is provided at an outer peripheral surface of the first pulley 21 for guiding the first cable 25. The shaft member 40 includes a fixing portion 41 fixed to the bracket 50, a shaft portion 42 extending from the fixing portion 41 and a flange 43 provided at the shaft portion 42. The first pulley 21 is rotatably mounted to the shaft portion 42.

Figure 6:
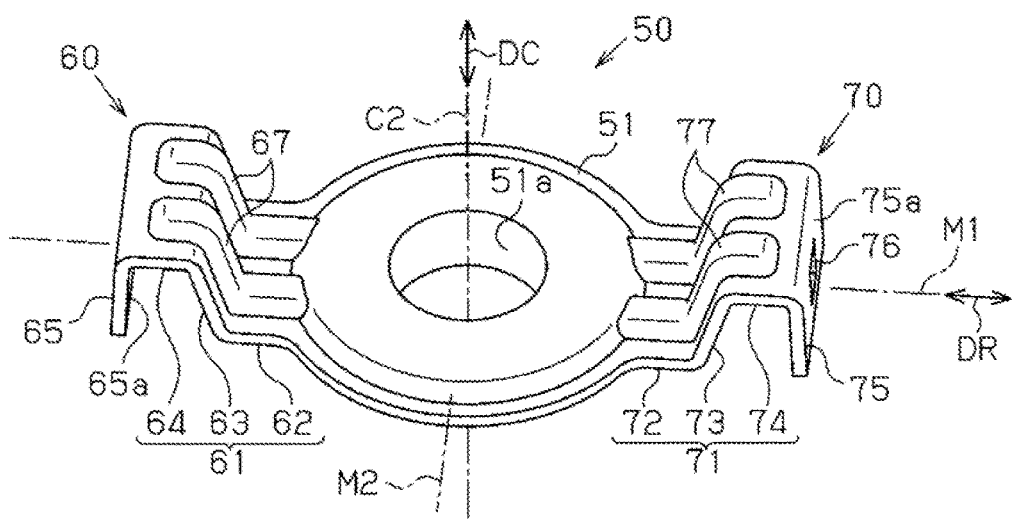
FIG. 6 is a perspective view of a bracket.

As illustrated in FIG. 6, the bracket 50 includes an inner surface facing inward relative to a radial direction DR and an outer surface facing outward relative to the radial direction DR. The bracket 50 includes a body portion 51, a first mounting portion 60 and a second mounting portion 70. The first mounting portion 60 extends from an outer peripheral portion of the body portion 51. The second mounting portion 70 extends from a position opposite from the first mounting portion 60 at the outer peripheral portion of the body portion 51.

The body portion 51 is a portion where the first pulley 21 is arranged. A fitting portion 51a to which the fixing portion 41 of the shaft member 40 is fitted is provided at a center portion of the body portion 51. For example, the fitting portion 51a is a circular penetration bore as illustrated in FIG. 6.

As illustrated in FIG. 5, a first fixing portion 120 is provided at the pulley unit mounting portion 100. The first mounting portion 60 is configured to bridge over the first fixing portion 120 and arranged along the first fixing portion 120. Specifically, the first mounting portion 60 includes a first arm portion 61 and a first extension portion 65 extending from the first arm portion 61. The first arm portion 61 includes a base portion 62 extending from the body portion 51 in the radial direction DR, an inclination portion 63 extending from the base portion 62 in a center axis direction DC and a connection portion 64 extending from the inclination portion 63 in the radial direction DR. The connection portion 64 is a portion connecting between the inclination portion 63 and the first extension portion 65. Two reinforcement ribs 67 are provided at the first arm portion 61. The two reinforcement ribs 67 extend from the base portion 62 to the connection portion 64.

Figure 11A:
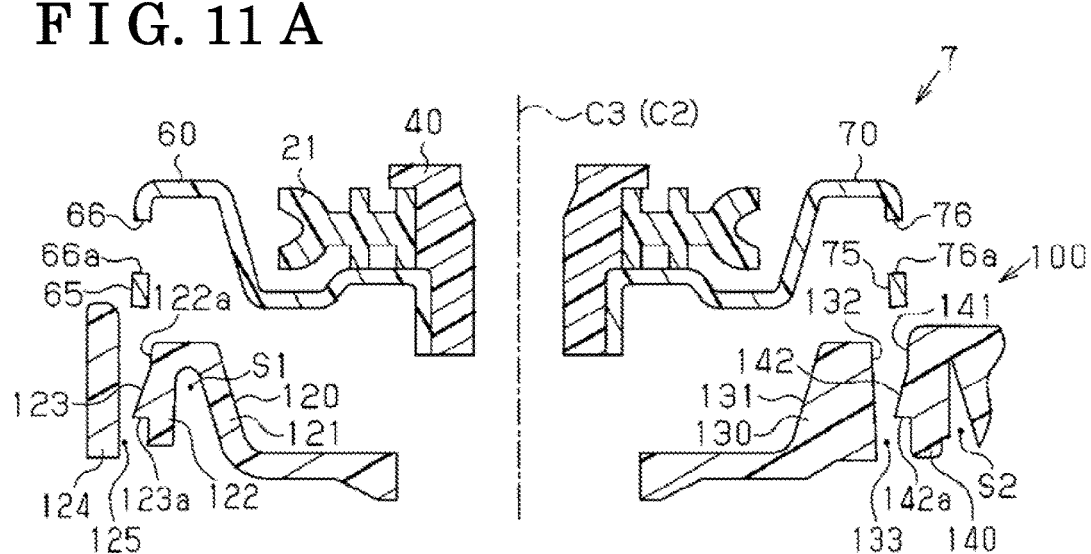
FIG. 11A is a cross-sectional view illustrating a state before the pulley unit is mounted.

The first extension portion 65 extends towards the support plate 10 from the connection portion 64. As illustrated in FIG. 11C, an inner surface 65a of the first extension portion 65 is in contact with an outer surface 122a of the first fixing portion 120 of the pulley unit mounting portion 100. For example, the inner surface 65a of the first extension portion 65 is a plane vertically or substantially vertically intersecting with a first symmetrical axis M1. The first symmetrical axis M1 is an axis line extending in a direction where the first mounting portion 60 and the second mounting portion 70 of the bracket 50 are arranged side by side.

Figure 7:
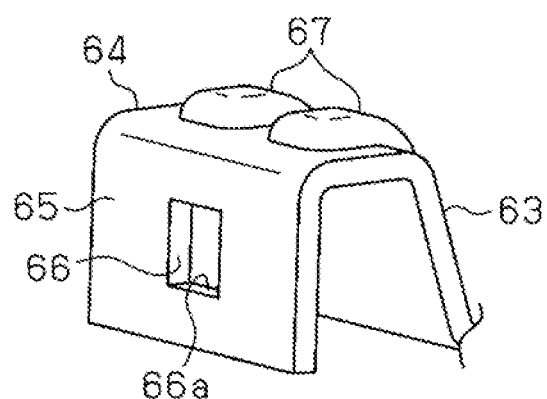
FIG. 7 is a perspective view of a first mounting portion of the bracket.

As illustrated in FIG. 7, a first fitting portion 66 is provided at the first extension portion 65 so as to engage with a first engagement portion 123 of the first fixing portion 120. For example, the first fitting portion 66 is a rectangular penetration bore provided at the first extension portion 65. As illustrated in FIG. 11C, a contact surface 66a is provided at an inner peripheral surface of the penetration bore so that the contact surface 66a makes contact with an engagement surface 123a of the first engagement portion 123.

Next, the second mounting portion 70 is explained with reference to FIGS. 5 and 6. As illustrated in FIG. 5, a second fixing portion 130 is provided at the pulley unit mounting portion 100. The second mounting portion 70 is configured to bridge over the second fixing portion 130 and arranged along the second fixing portion 130. Specifically, the second mounting portion 70 includes a second arm portion 71 and a second extension portion 75 extending from the second arm portion 71.

The second arm portion 71 includes a base portion 72 extending from the body portion 51 in the radial direction DR, an inclination portion 73 extending from the base portion 72 in the center axis direction DC and a connection portion 74 extending from the inclination portion 73 in the radial direction DR. The connection portion 74 is a portion connecting between the inclination portion 73 and the second extension portion 75. As illustrated in FIG. 11C, the inclination portion 73 is in contact with an inner surface 131 of the second fixing portion 130. Two reinforcement ribs 77 are provided at the second arm portion 71. The two reinforcement ribs 77 extend from the base portion 72 to the connection portion 74.

The second extension portion 75 extends towards the support plate 10 from the connection portion 74. An outer surface 75a of the second extension portion 75 is in contact with a wall portion 140 of the pulley unit mounting portion 100. For example, the outer surface 75a of the second extension portion 75 is a plane vertically or substantially vertically intersecting with the first symmetrical axis M1.

Figure 9:
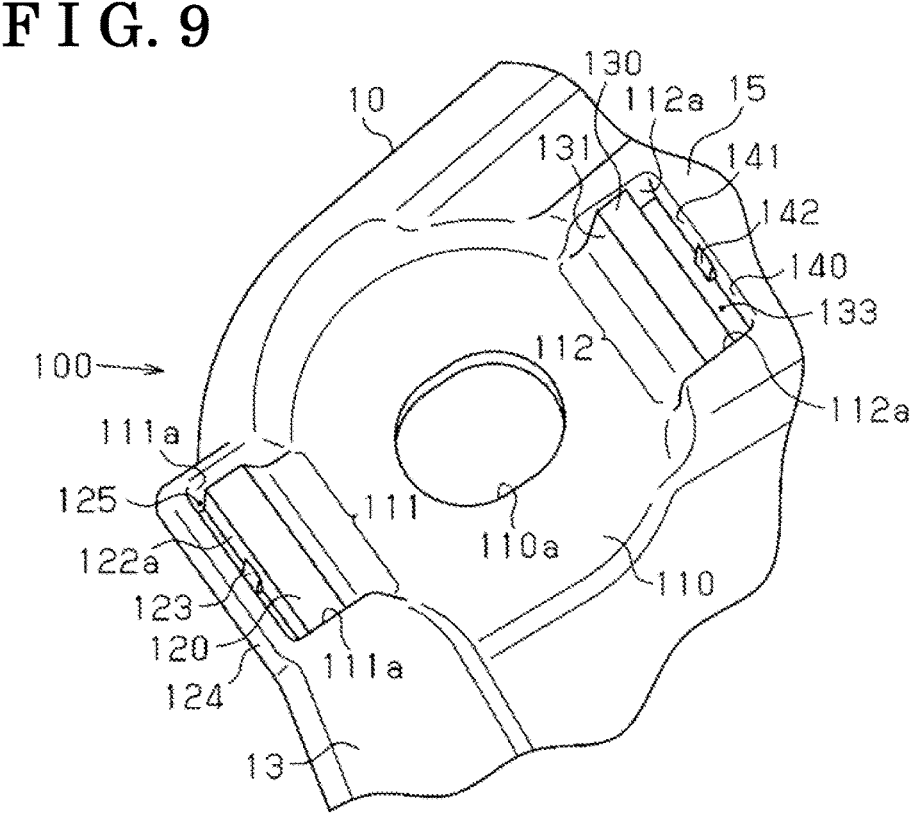
FIG. 9 is a perspective view of a pulley unit mounting portion.

As illustrated in FIG. 9, a second engagement portion 142 is provided at the wall portion 140 of the pulley unit mounting portion 100. As illustrated in FIG. 11C, a second fitting portion 76 is provided at the second extension portion 75 so as to engage with the second engagement portion 142. For example, the second fitting portion 76 is a rectangular penetration bore provided at the second extension portion 75. A contact surface 76a is provided at an inner peripheral surface of the penetration bore so that the contact surface 76a is in contact with an engagement surface 142a of the second engagement portion 142.

Figure 8:
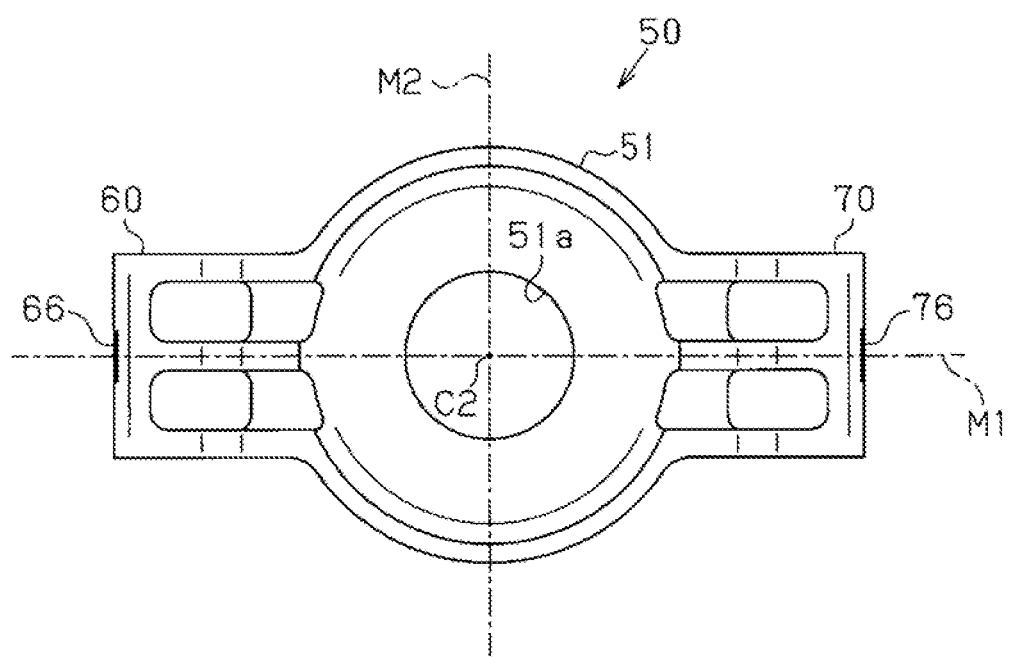
FIG. 8 is a plan view of the bracket.

Next, a symmetrical structure of the bracket 50 is explained with reference to FIG. 8. As illustrated in FIG. 8, the first mounting portion 60 and the second mounting portion 70 are arranged at different portions of the support plate 10 from each other. The first and second mounting portions 60 and 70 desirably include the same outer configurations so that the bracket 50 has symmetric property. The bracket 50 of the embodiment includes the symmetric property as illustrated in FIGS. 5, 6 and 8. For example, as illustrated in FIG. 8, the bracket 50 is desirably line-symmetrical to the first symmetrical axis M1 in a plan view. Accordingly, a force applied to the first and second fixing portions 120 and 130 via the first and second mounting portions 60 and 70 may be evenly dispersed to the opposed sides of a second symmetrical axis M2.

Further, the bracket 50 is desirably line-symmetrical to the second symmetrical axis M2 orthogonal to the first symmetrical axis M1 in addition to being line-symmetrical to the first symmetrical axis M1. As a result, the bracket 50 may have rotational symmetry about a center axis C2 thereof, i.e., have twofold symmetry. According to such construction, the pulley unit 7 may be mounted to the pulley unit mounting portion 100 in a predetermined direction or in a direction rotated by 180 degrees from the predetermined direction, for example. As a result, mountability of the pulley unit 7 increases.

Next, the pulley unit mounting portion 100 is explained with reference to FIG. 9. An outer side of the pulley unit mounting portion 100 indicates a portion away from a center axis C3 of the pulley unit mounting portion 100 illustrated in FIG. 5. An inner side of the pulley unit mounting portion 100 indicates a portion close to the center axis C3 of the pulley unit mounting portion 100.

As illustrated in FIG. 9, the pulley unit mounting portion 100 includes a pulley arrangement portion 110 at which the first pulley 21 is arranged, a first fit portion 111 to which the first mounting portion 60 of the bracket 50 is fitted and a second fit portion 112 to which the second mounting portion 70 of the bracket 50 is fitted. The pulley arrangement portion 110 is a portion at which the body portion 51 of the bracket 50 is arranged.

The pulley arrangement portion 110 includes a penetration bore 110a into which a fastening portion 52 of the bracket 50 is inserted to be positioned. The bracket 50 is fixed to the inner panel 3 by a bolt in a state where an end surface of the fastening portion 52 is in contact with the inner panel 3. In the aforementioned state, the pulley arrangement portion 110 is sandwiched between the inner panel 3 and the bracket 50 as illustrated in FIG. 11C.

Figure 10:
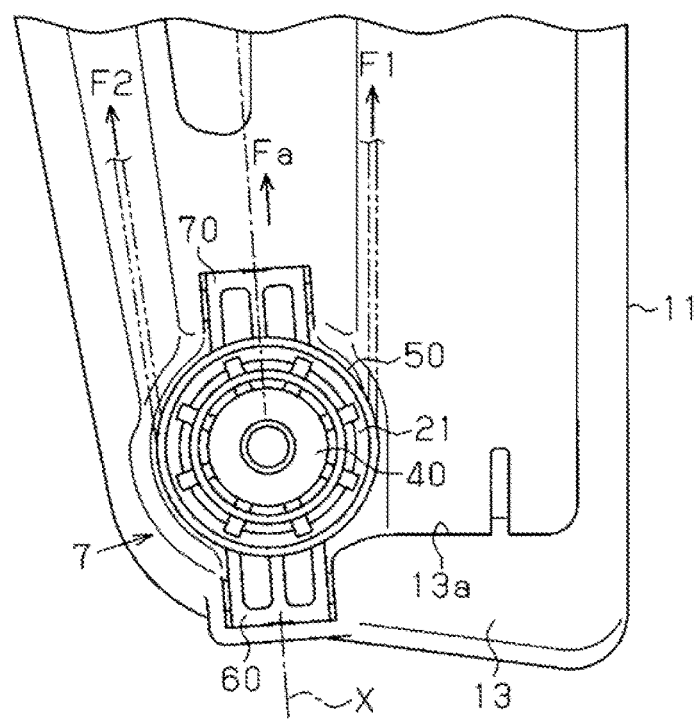
FIG. 10 is a plan view of a portion at which the pulley unit is arranged.

The first fit portion 111 and the second fit portion 112 are arranged at opposed sides of the pulley arrangement portion 110. The first fit portion 111 is arranged in the vicinity of the first cable 25. As illustrated in FIG. 10, the second fit portion 112 is arranged at the opposite side from the first fit portion 111 in a state where the pulley arrangement portion 110 is sandwiched between the second fit portion 112 and the first fit portion 111.

According to the aforementioned relationship, the first fixing portion 120 and the second fixing portion 130 are arranged at the opposed sides of the pulley arrangement portion 110. The first fixing portion 120 is arranged in the vicinity of the first cable 25. The second fixing portion 130 is arranged at the opposite side from the first fixing portion 120 in a state where the pulley arrangement portion 110 is sandwiched between the second fixing portion 130 and the first fixing portion 120. Specifically, the first fixing portion 120 is arranged at an outer side of the first cable 25. That is, the first fixing portion 120 is arranged at a portion where the first pulley 21 is not included in a state where the support plate 10 is defined by the first cable 25. The second fixing portion 130 is arranged at an inner side of the first cable 25. That is, the second fixing portion 130 is arranged at a portion where the first pulley 21 is included in a state where the support plate 10 is defined by the first cable 25.

Next, the first fit portion 111 is explained with reference to FIG. 9. As illustrated in FIG. 9, the first fit portion 111 includes a pair of side walls 111a which is in contact with side surfaces of the first mounting portion 60. The first fixing portion 120 to which the first mounting portion 60 is mounted and a wall portion 124 arranged at an outer side of the first fixing portion 120 are provided at the first fit portion 111. A first insertion bore 125 into which the first extension portion 65 of the bracket 50 is inserted to be positioned is provided between the first fixing portion 120 and the wall portion 124.

The first fixing portion 120 is provided between the pair of side walls 111a of the first fit portion 111. The first fixing portion 120 protrudes from the pulley arrangement portion 110 to substantially the same height as the first pulley 21. The first fixing portion 120 includes an inner wall portion 121 provided in the vicinity of the pulley arrangement portion 110 and an outer wall portion 122 extending from the inner wall portion 121. As illustrated in FIG. 11C, a void S1 is provided between the inner wall portion 121 and the outer wall portion 122. The first fixing portion 120 is configured in a V-shape in a cross-sectional view. As a result, the outer wall portion 122 may be deflected towards the inner wall portion 121.

The first engagement portion 123 is provided at the outer surface 122a of the outer wall portion 122 so as to engage with the first fitting portion 66 of the bracket 50. The first engagement portion 123 includes the engagement surface 123a with which the contact surface 66a of the first fitting portion 66 makes contact. For example, the first engagement portion 123 is a projection projecting from the outer surface 122a of the first fixing portion 120. The engagement surface 123a is a plane vertically or substantially vertically intersecting with the center axis C2.

The second fit portion 112 is also explained with reference to FIG. 9. As illustrated in FIG. 9, the second fit portion 112 includes a pair of side walls 112a which is in contact with side surfaces of the second mounting portion 70. The second fixing portion 130 to which the second mounting portion 70 is mounted and the wall portion 140 arranged at an outer side of the second fixing portion 130 are provided at the second fit portion 112. A second insertion bore 133 into which the second extension portion 75 of the bracket 50 is inserted to be positioned is provided between the second fixing portion 130 and the wall portion 140.

The second fixing portion 130 is provided between the pair of side walls 112a of the second fit portion 112. The second fixing portion 130 protrudes from the pulley arrangement portion 110 to substantially the same height as the first pulley 21. As illustrated in FIG. 11A, the second fixing portion 130 includes the inner surface 131 arranged in the vicinity of the pulley arrangement portion 110 and an outer surface 132 arranged at the opposite side from the inner surface 131.

The wall portion 140 is a portion of a stepped portion 15 of the support plate 10. A void S2 is provided at a back side of the wall portion 140. The wall portion 140 is configured to deflect towards the stepped portion 15. The second engagement portion 142 which engages with the second fitting portion 76 of the bracket 50 is provided at a wall surface 141 of the wall portion 140. The second engagement portion 142 includes the engagement surface 142a with which the contact surface 76a of the second fitting portion 76 makes contact. For example, the second engagement portion 142 is a projection projecting from the wall surface 141 of the wall portion 140. The engagement surface 142a is a plane vertically or substantially vertically intersecting with the center axis C2.

Next, an arrangement direction of the pulley unit 7 is explained with reference to FIG. 10. An alternate long and short dash line X in FIG. 10 indicates the arrangement direction of the pulley unit 7. The arrangement direction of the pulley unit 7 is specified on a basis of a relation with a force applied to the pulley unit 7. The arrangement direction of the pulley unit 7 indicates the direction of the pulley unit 7 relative to a wiring configuration of the first cable 25. The direction of the pulley unit 7 is defined as a reference line which passes through a center point of the pulley unit 7 and which extends in a direction where the first mounting portion 60 and the second mounting portion 70 are arranged side by side. For example, in a case where the pulley unit 7 has line-symmetry with respect to the first symmetrical axis M1, the direction of the pulley unit 7 matches the first symmetrical axis M1.

The arrangement direction of the pulley unit 7 is explained with reference to FIG. 10 as below. A large tensile force may be applied to the first cable 25. For example, in a case where the first carrier 31 makes contact with the stopper 13 so that the window glass 5 is stopped in a fully open state or the window glass 5 makes contact with an outer frame of the outer panel 2 so that the window glass 5 is stopped in a fully closed state, the motor unit 6 is in a rotationally driven state at the instant the window glass 5 is stopped. At this time, the large tensile force is applied to the first cable 25 or the second cable 26.

As illustrated in FIG. 10, in a case where the large tensile force is applied to the first cable 25, a resultant force of a first tensile force F1 which operates between the first pulley 21 and the second pulley 22 and a second tensile force F2 which operates between the first pulley 21 and the drum 28 (which is hereinafter referred to as a "tensile resultant force Fa") is applied to the first pulley 21. The direction of the tensile resultant force Fa corresponds to a direction of a vector sum of the first tensile force F1 and the second tensile force F2. That is, the direction of the tensile resultant force Fa matches a bisector which bisects between a suspension direction of the first cable 25 between the first pulley 21 and the second pulley 22 and a suspension direction of the first cable 25 between the first pulley 21 and the drum 28.

In order to effectively transmit the tensile resultant force Fa to the support plate 10 via the bracket 50, the direction of the tensile resultant force Fa desirably matches the direction of the pulley unit 7, i.e., the reference line of the pulley unit 7. Thus, the pulley unit 7 is arranged so that the direction of the pulley unit 7, i.e., the reference line of the pulley unit 7, matches the direction of the tensile resultant force Fa. Because of the aforementioned arrangement of the pulley unit 7, a major portion of the tensile resultant force Fa applied to the pulley unit 7 by the pulling of the first cable 25 is transmitted to the first and second fixing portions 120 and 130 via the first and second mounting portions 60 and 70. As a result, a vertical component applied to the bracket 50, i.e., a component applied along the center axis C2, decreases.

A method for mounting the pulley unit 7 to the support plate 10 is explained with reference to FIGS. 11A, 11B and 11C. First, the pulley unit 7 is arranged as illustrated in FIG. 11A. That is, the pulley unit 7 is arranged relative to the support plate 10 so that the center axis C3 of the pulley unit mounting portion 100 and the center axis C2 of the pulley unit 7 match each other.

Figure 11B:
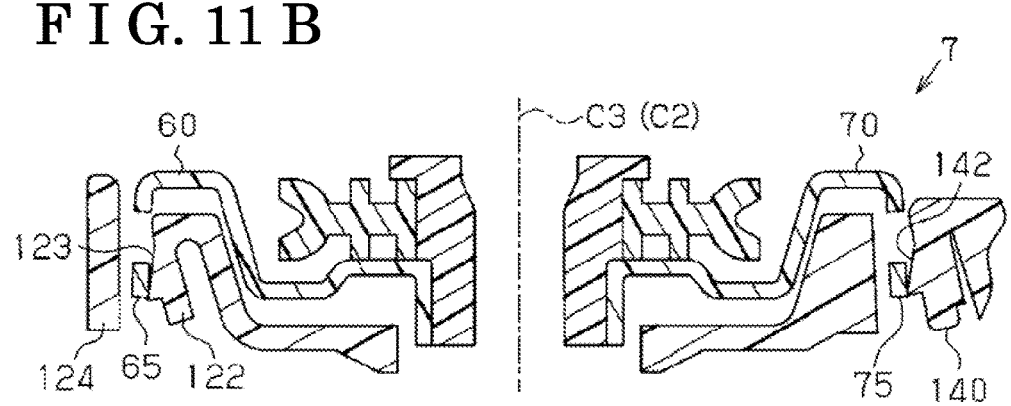
FIG. 11B is a cross-sectional view illustrating a state before the mounting of the pulley unit is completed.
Figure 11C:
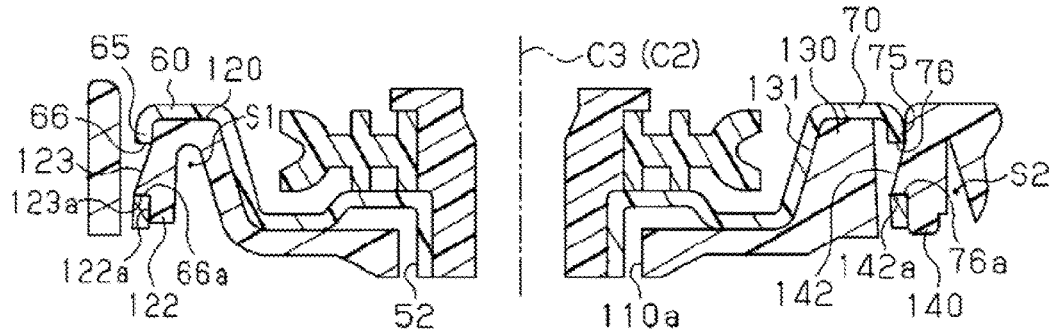
FIG. 11C is a cross-sectional view illustrating a state where the mounting of the pulley unit is completed.

Next, as illustrated in FIG. 11B, the pulley unit 7 is moved along the center axis C3 of the pulley unit mounting portion 100. Because of the aforementioned movement of the pulley unit 7, the first extension portion 65 of the bracket 50 is inserted to the first insertion bore 125 of the pulley unit mounting portion 100 so that an end of the first extension portion 65 makes contact with the first engagement portion 123 of the first fixing portion 120. The contact between the first extension portion 65 and the first engagement portion 123 causes the outer wall portion 122 of the first fixing portion 120 to be deflected. In addition, the second extension portion 75 of the bracket 50 is inserted to the second insertion bore 133 of the pulley unit mounting portion 100 so that an end of the second extension portion 75 makes contact with the second engagement portion 142 of the wall portion 140. Then, the contact between the second extension portion 75 and the second engagement portion 142 causes the wall portion 140 to be deflected.

The pulley unit 7 is further moved along the center axis C3 of the pulley unit mounting portion 100. Then, as illustrated in FIG. 11C, the first fitting portion 66 of the bracket 50 engages with the first engagement portion 123 and the second fitting portion 76 of the bracket 50 engages with the second engagement portion 142. In the aforementioned state, the contact surface 66a of the first fitting portion 66 makes contact with the engagement surface 123a of the first engagement portion 123 and the contact surface 76a of the second fitting portion 76 makes contact with the engagement surface 142a of the second engagement portion 142. Accordingly, the pulley unit 7 which is linearly moved is mounted to the pulley unit mounting portion 100 of the support plate 10.

Next, an operation of the lifting and lowering apparatus 4 is explained with reference to FIGS. 12A to 13D. First, the lifting and lowering apparatus 4 according to a reference example is employed for explaining a separation phenomenon of the bracket 50. FIG. 12A illustrates a cross-sectional view of a pulley unit 7X of the reference example.

As illustrated in FIG. 12A, a bracket 500 of the pulley unit 7X includes a body portion 510, first and second mounting portions 600 and 700 each of which protrudes from the body portion 510. A first engagement portion 910 and a second engagement portion 920 are provided at a pulley unit mounting portion 900. An outer surface 610 of the first mounting portion 600 is in contact with the first engagement portion 910 and an end surface 620 of the first engagement portion 600 engages with the first engagement portion 910. An outer surface 710 of the second mounting portion 700 is in contact with the second engagement portion 920 and an end surface 720 of the second mounting portion 700 engages with the second engagement portion 920. That is, the pulley unit 7X is retained by the first engagement portion 910 which holds the end surface 620 of the first mounting portion 600 and the second engagement portion 920 which holds the end surface 720 of the second mounting portion 700.

In a case where a tensile force is applied to a cable of the aforementioned pulley unit 7X, the tensile resultant force Fa is applied to the pulley unit 7X as illustrated in FIG. 12A. At this time, a portion of the tensile resultant force Fa is transmitted to the second engagement portion 920 of the pulley unit mounting portion 900 via a shaft portion 400 and the bracket 500 as illustrated by an arrow Fb1 in FIG. 12B. In a case where the tensile resultant force Fa increases, the pulley unit 7X is deformed so that the shaft member 400 comes closer to the second engagement portion 920. Specifically, stress is focused on a base end portion of the second mounting portion 700, i.e., a portion between the body portion 510 and the second mounting portion 700. Thus, the base end portion of the second mounting portion 700 is bent.

In addition, as illustrated by an arrow Fb2 in FIG. 12B, a portion of a force applied to the bracket 500 acts on the pulley unit 7X along the center axis C2. Thus, the pulley unit 7X rotates about a contact portion between the second mounting portion 700 and the second engagement portion 920 as a support point P. The pulley unit 7X is deformed to rotate so that a gap G is formed between the first mounting portion 600 and the first engagement portion 910. Accordingly, the engagement between the first mounting portion 600 and the first engagement portion 910 is released or is brought to an easily released state.

FIG. 12C illustrates a change mode of the pulley unit 7X in a case where the tensile resultant force Fa is applied to a pulley 200 and a force is applied to the pulley unit mounting portion 900 positioned at a lower end of the support plate 10. For example, in a case where the first carrier 31 makes contact with the stopper 13 so that the window glass 5 is stopped in the fully open state, the motor unit 6 is in the rotationally driven state at the instant the window glass 5 is stopped. Thus, a large tensile force is applied to the cable. In addition, at the instant the window glass 5 is brought to the fully open state, the first carrier 31 collides against the stopper 13. The aforementioned collision force deforms the support plate 10. Specifically, in a case where the support plate 10 includes a curving configuration, the support plate 10 is deflected so that a degree of curving increases. As illustrated by an arrow Fb3 in FIG. 12C, the first engagement portion 910 moves inward to the inner panel 3.

Therefore, the deformation of the pulley unit 7X caused by the tensile resultant force Fa applied to the pulley 200 and the deformation of the support plate 10 caused by the collision of the first carrier 31 to the stopper 13 increase the gap G between the first mounting portion 600 and the first engagement portion 910. As a result, possibility of releasing the engagement between the first mounting portion 600 and the first engagement portion 910 increases.

FIG. 12D illustrates a change that continuously occurs from the state of the pulley unit 7X in FIG. 12C. In a case where the motor unit 6 is stopped under the state illustrated in FIG. 12C, the tensile force applied to the cable decreases so that the tensile resultant force Fa applied to the pulley 200 is eliminated. Stress stored at the pulley unit 7X is therefore released. As a result, the pulley unit 7X deforms or rotates from the state illustrated in FIG. 12C. At this time, the gap G between the first mounting portion 600 and the first engagement portion 910 decreases with the rotation or deformation of the pulley unit 7X while the gap G is generated between the second mounting portion 700 and the second engagement portion 920. Because of the above, the engagement between the second mounting portion 700 and the second engagement portion 920 is also released or is brought to an easily released state.

As mentioned above, the bracket 500 disengages from the support plate 10 based on at least one of the deformation of the pulley unit 7X caused by the tensile resultant force Fa applied to the pulley unit 7X and the deformation of the pulley unit mounting portion 900 caused by the collision of the first carrier 31 against the stopper 13.

Next, an operation of the lifting and lowering apparatus 4 is explained with reference to FIGS. 13A to 13D. FIGS. 13A to 13D are cross-sectional views taken along line XIIIA, XIIIB, XIIIC, XIIID-XIIIA, XIIIB, XIIIC, XIIID in FIG. 2. In a case where the tensile force is applied to the first cable 25, the tensile resultant force Fa is applied to the pulley unit 7 as illustrated in FIG. 13A. At this time, as illustrated in FIG. 13B, a portion of the tensile resultant force Fa is applied to the bracket 50 via the shaft member 40. A portion Fa1 of the force applied to the bracket 50 is transmitted to the first fixing portion 120 of the pulley unit mounting portion 100 via the first extension portion 65 of the first mounting portion 60. The other portion Fa2 of the force applied to the bracket 50 is transmitted to the second fixing portion 130 of the pulley unit mounting portion 100 via the second arm portion 71 of the second mounting portion 70. The other portion Fa3 of the force applied to the bracket 50 is also transmitted to the wall portion 140 of the pulley unit mounting portion 100 via the second extension portion 75 of the second mounting portion 70. That is, the tensile resultant force Fa is dispersed to be transmitted to the pulley unit mounting portion 100.

In a case where the tensile resultant force Fa is large, a compression force for bringing the shaft member 40 to approach the second fixing portion 130 increases. Nevertheless, at this time, the first extension portion 65 of the first mounting portion 60 presses the outer surface 122a of the first fixing portion 120. Thus, the compression force decreases as compared to the pulley unit 7X of the reference example. In addition, the compression force acts on the bracket 50 so that the first extension portion 65 moves towards the shaft member 40. Nevertheless, the movement of the first extension portion 65 is interrupted by the first fixing portion 120 to thereby restrain deformation of the bracket 50.

In addition, a portion Fc of the force applied to the bracket 50 functions to rotate the pulley unit 7 about a contact portion between the second extension portion 75 of the second mounting portion 70 and the wall portion 140 as the support point P. Nevertheless, as mentioned above, because the tensile resultant force Fa is dispersed to the first fixing portion 120, the second fixing portion 130 and the wall portion 140, the force for rotating the pulley unit 7 decreases.

Further, the rotation of the pulley unit 7 about the contact portion between the second extension portion 75 of the second mounting portion 70 and the wall portion 140 as the support point P is restrained by the engagement between the first fitting portion 66 of the first mounting portion 60 and the first engagement portion 123 of the first fixing portion 120. Thus, the mounting state of the pulley unit 7 is inhibited from being greatly changed between before and after the application of the tensile resultant force Fa to the pulley unit 7.

Next, the other change mode of the pulley unit 7 is explained with reference to FIG. 13C. FIG. 13C illustrates the change mode of the pulley unit 7 in a case where the tensile resultant force Fa is applied to the first pulley 21 and a force is applied to the pulley unit mounting portion 100 positioned at the lower end of the support plate 10. For example, as having been explained with reference to FIG. 12C, the force is applied to the lower end of the support plate 10 in a case where the window glass 5 is stopped in the fully open state. At this time, as mentioned above, when the first carrier 31 collides against the stopper 13, the collision force is applied to the support plate 10. Specifically, in a case where the support plate 10 includes a curving configuration, the support plate 10 is deflected to increase a degree of curving thereof.

At this time, as illustrated by an arrow Fd in FIG. 13C, the support plate 10 is deflected so that the first fixing portion 120 moves inward to the inner panel 3. Nevertheless, because of the engagement between the first fitting portion 66 of the first mounting portion 60 and the first engagement portion 123 of the first fixing portion 120, the bracket 50 is deformed to follow the support plate 10. Thus, even in a case where the bracket 50 is deformed, no gap is generated between the first mounting portion 60 and the first fixing portion 120. In addition, as illustrated by the arrow Fd in FIG. 13C, the moving direction of the first fixing portion 120 matches or substantially matches a direction where the contact surface 66a of the first fitting portion 66 and the engagement surface 123a of the first engagement portion 123 are pressed against each other. Thus, the engagement position between the contact surface 66a and the engagement surface 123a is unlikely to be displaced, which results in unlikeliness of disengagement between the first fitting portion 66 and the first engagement portion 123. Thus, the bracket 50 is restrained from disengaging from the pulley unit mounting portion 100.

FIG. 13D illustrates a state of the pulley unit 7 continued from FIG. 13C. In a case where the motor unit 6 is stopped in the state illustrated in FIG. 13C, the tensile force applied to the first cable 25 decreases so that the tensile resultant force Fa applied to the first pulley 21 is eliminated. The stress stored at the pulley unit 7 is released accordingly. As a result, a force Fe for deforming and rotating the pulley unit 7 from the state in FIG. 13C acts on the pulley unit 7.

At this time, the engagement between the second fitting portion 76 of the second mounting portion 70 and the second engagement portion 142 of the wall portion 140 restrains the rotation or deformation of the pulley unit 7. In addition, the direction of the force Fe matches or substantially matches the direction where the contact surface 76a of the second fitting portion 76 and the engagement surface 142a of the second engagement portion 142 are pressed against each other. Therefore, the engagement position between the contact surface 76a and the engagement surface 142a is difficult to be displaced. The engagement between the second fitting portion 76 and the second engagement portion 142 is also difficult to be released. Thus, the bracket 50 is restrained from disengaging from the pulley unit mounting portion 100.

Effects of the lifting and lowering apparatus 4 according to the present embodiment are explained below. In the following, effects of a construction of a portion including the first pulley 21 are explained, however, constructions including the second to fourth pulleys 22 to 24 include the similar effects.

(1) The support plate 10 is provided with the pulley arrangement portion 110 and the first and second fixing portions 120, 130. The pulley arrangement portion 110 is disposed between the first and second fixing portions 120 and 130. The first fixing portion 120 is arranged at the outer side of the first cable 25 while the second fixing portion 130 is arranged at the inner side of the first cable 25. The bracket 50 includes the body portion 51 at which the first pulley 21 is arranged, the first mounting portion 60 mounted to the first fixing portion 120 and the second mounting portion 70 mounted to the second fixing portion 130. The first mounting portion 60 includes the first arm portion 61 extending from the body portion 51 and the first extension portion 65 which extends from the first arm portion 61 and which is in contact with the outer surface 122a of the first fixing portion 120. The second mounting portion 70 includes the second arm portion 71 which extends from the body portion 51 and which is in contact with the inner surface 131 of the second fixing portion 130.

According to the aforementioned construction, in a case where the tensile force is applied to the first cable 25, the first extension portion 65 of the bracket 50 presses the outer surface 122a of the first fixing portion 120 while the second arm portion 71 of the bracket 50 presses the inner surface 131 of the second fixing portion 130. That is, in a case where the tensile force of the first cable 25 is applied to the bracket 50 via the first pulley 21, the aforementioned force is dispersed to be transmitted to the first and second fixing portions 120 and 130 via the first and second mounting portions 60 and 70. Thus, the force for rotating the bracket 50, i.e., the force for disengaging the bracket 50, decreases. The removal of the bracket 50 from the support plate 10 may be therefore restrained.

(2) The pulley unit mounting portion 100 includes the first engagement portion 123 at the outer surface 122a of the first fixing portion 120. The first fitting portion 66 which engages with the first engagement portion 123 is provided at the first extension portion 65 of the bracket 50. For example, a force for rotating the bracket 50, i.e., a force for disengaging the bracket 50, may act on the bracket 50. In this case, according to the aforementioned construction, the engagement between the first engagement portion 123 and the first fitting portion 66 interrupts the rotation of the bracket 50. Thus, the bracket 50 may be restrained from disengaging from the support plate 10. In addition, each of the engagement surface 123a of the first engagement portion 123 and the contact surface 66a of the first fitting portion 66 is desirably a plane vertically or substantially vertically intersecting with the center axis C2 of the bracket 50. As a result, in a case where the force for rotating the bracket 50 is operated, the engagement between the first engagement portion 123 and the first fitting portion 66 is restrained from being released.

(3) The second mounting portion 70 includes the second arm portion 71 and the second extension portion 75 extending from the second arm portion 71. The support plate 10 includes the wall portion 140 at the outer side of the second fixing portion 130, the wall portion 140 with which the second extension portion 75 of the second mounting portion 70 makes contact. The void is formed between the second fixing portion 130 and the wall portion 140. According to such construction, in a case where the tensile force is applied to the first cable 25, the second extension portion 75 of the bracket 50 presses the wall portion 140. That is, in a case where the tensile force of the first cable 25 is applied to the bracket 50 via the first pulley 21, the aforementioned force is transmitted not only to the first fixing portion 120 and the second fixing portion 130 but also to the wall portion 140. Thus, the force for rotating the bracket 50, i.e., the force for disengaging the bracket 50, decreases. The bracket 50 may be therefore restrained from being removed from the support plate 10.

(4) The second engagement portion 142 is provided at the wall portion 140. The second fitting portion 76 which engages with the second engagement portion 142 is provided at the second extension portion 75 of the second mounting portion 70. According to such construction, in a case where the force for rotating the bracket 50, i.e., the force for disengaging the bracket 50, is applied to the bracket 50, the rotation of the bracket 50 is interrupted by the engagement between the second engagement portion 142 and the second fitting portion 76. Thus, the bracket 50 is restrained from being removed from the support plate 10. In addition, each of the engagement surface 142a of the second engagement portion 142 and the contact surface 76a of the second fitting portion 76 is desirably a plane vertically or substantially vertically intersecting with the center axis C2 of the bracket 50. As a result, in a case where the force for rotating the bracket 50 is operated, the engagement between the second engagement portion 142 and the second fitting portion 76 may be restrained from being released.

(5) The first fit portion 111 to which the first mounting portion 60 of the bracket 50 is fitted and the second fit portion 112 to which the second mounting portion 70 is fitted are provided at the support plate 10. The first fixing portion 120 is a portion of the first fit portion 111 while the second fixing portion 130 is a portion of the second fit portion 112. For example, a force for twisting the support plate 10 may act on the support plate 10. In this case, according to the aforementioned construction, the first mounting portion 60 engages with the first fit portion 111 or the second mounting portion 70 engages with the second fit portion 112, thereby restraining the removal of the bracket 50.

(6) The reinforcement ribs 67 are provided at the first mounting portion 60. The reinforcement ribs 67 extend in the longitudinal direction of the first mounting portion 60. The reinforcement ribs 77 are provided also at the second mounting portion 70. The reinforcement ribs 77 extend in the longitudinal direction of the second mounting portion 70. According to such construction, the first and second mounting portions 60 and 70 are reinforced by the reinforcement ribs 67 and 77. Thus, deformation or degradation of the first and second mounting portions 60 and 70 may be restrained.

(7) The bracket 50 has a line-symmetrical structure with respect to the first symmetrical axis M1. The first symmetrical axis M1 is the axis line extending in the direction where the first mounting portion 60 and the second mounting portion 70 are arranged side by side. According to the aforementioned construction, in a case where the tensile force of the first cable 25 is applied to the first fixing portion 120 via the first mounting portion 60 and to the second fixing portion 130 via the second mounting portion 70, the force is evenly dispersed to be transmitted to the respective sides of the first symmetrical axis M1. Accordingly, the distortion of the bracket 50 caused by the tensile force of the first cable 25 may be restrained.

(8) The bracket 50 has rotational symmetry. According to such construction, the second mounting portion 70 may be positioned at the first fixing portion 120 and the first mounting portion 60 may be positioned at the second fixing portion 130. Thus, the bracket 50 may be mounted to the support plate 10 regardless of the direction of the bracket 50. The mountaiblity of the bracket 50 thus improves.

(9) The support plate 10 includes the stopper 13 at the lower side of the rotation axis C1 of the first pulley 21. The lower the stopper 13 is arranged, the greater the deflection of the support plate 10 generated by the contact of the first carrier 31 with the stopper 13. The bracket 50 may easily disengage from the support plate 10. Nevertheless, because the bracket 50 includes the construction based on the above, the bracket 50 may be restrained from disengaging from the support plate 10. As a result, the stopper 13 is allowed to be provided at the lower side of the rotation axis C1 of the first pulley 21 at the support plate 10.

(10) In a case where neither the outer wall portion 122 nor the wall portion 140 includes flexibility, the mountability of the pulley unit 7 decreases. In this case, first, it is necessary that the pulley unit 7 is arranged to incline to the pulley unit mounting portion 100 and one of the first and second mounting portions 60 and 70 engages with the pulley unit mounting portion 100 and thereafter the other of the first and second mounting portions 60 and 70 engages with the pulley unit mounting portion 100. In addition, a considerable force is required for mounting the pulley unit 7 to the pulley unit mounting portion 100. Nevertheless, according to the aforementioned construction, both the outer wall portion 122 at which the first engagement portion 123 is provided and the wall portion 144 at which the second engagement portion 142 is provided include flexibility. Thus, as illustrated in FIGS. 11A to 11C, the pulley unit 7 is simply lineally moved to be easily mounted to the pulley unit mounting portion 100. The mountability of the pulley unit 7 therefore improves.

The aforementioned embodiment may be modified as follows. The first fitting portion 66 and the second fitting portion 76 are not limited to the penetration bores. FIG. 14 illustrates another example of the first fitting portion 66. A first fitting portion 1010 includes a cutout portion 1011 into which the first engagement portion 123 is inserted to be positioned and protrusions 1012 protruding from opposed side surfaces of the cutout portion 1011. Ends of the protrusions 1012 face each other. The construction of the second fitting portion 76 may be the same as the embodiment.

The constructions of the first fitting portions 66 and 1010 illustrated in FIGS. 7 and 14 include the following advantages. That is, each of the first fitting portions 66 and 1010 illustrated in FIGS. 7 and 14 is applicable to the second fitting portion 76 without changing the construction of each of the first fitting portions 66 and 1010. Accordingly, the bracket 50 may have symmetry relative to the first symmetrical axis M1 and the second symmetrical axis M2.

The other examples of the first fitting portion 66 and the second fitting portion 76 are explained below. That is, an example of a case where the first fitting portion 66 and the second fitting portion 76 do not include the same constructions and therefore the bracket 50 is not able to have symmetry relative to the second symmetrical axis M2 is explained. The following example may practically exercise the same effect as the lifting and lowering apparatus 4 of the embodiment except for the symmetry.

FIG. 15 illustrates still another example of the first fitting portion 66. A first fitting portion 1020 may be a protrusion 1021 which is provided at the end of the first extension portion 65 and which protrudes inward to the center of the bracket 50. In this case, the first engagement portion 123 of the first fixing portion 120 may be the protrusion as explained in the embodiment. In addition, as illustrated in FIG. 15, a first engagement portion 2020 may include an engagement surface constituted by an end surface of the outer wall portion 122 of the first fixing portion 120.

FIG. 16 illustrates still another example of the first fitting portion 66. A first fitting portion 1030 may be a protrusion 1031 which is provided at the end of the first extension portion 65 and which protrudes inward to the center of the bracket 50 while a first engagement portion 2030 of the first fixing portion 120 may be a penetration bore at the outer wall portion 122.

FIG. 17 illustrates another example of the second fitting portion 76. A second fitting portion 1040 may be a protrusion 1041 which is provided at the end of the second extension portion 75 and which protrudes outward opposite from the center of the bracket 50. In this case, the second engagement portion 142 of the wall portion 140 may be the protrusion as explained in the embodiment. In addition, as illustrated in FIG. 17, a second engagement portion 2040 may include an engagement surface constituted by an end surface of the wall portion 140.

FIG. 18 illustrates still another example of the second fitting portion 76. A second fitting portion 1050 may be a protrusion 1051 which is provided at the end of the second extension portion 75 and which protrudes outward opposite from the center of the bracket 50 while a second engagement portion 2050 of the wall portion 140 may be a penetration bore at the wall portion 140.

Still another example of the second fitting portion 76 is explained. In the aforementioned embodiment, the second engagement portion 142 which engages with the second fitting portion 76 is provided at the wall portion 140. Instead, the second engagement portion 142 may be provided at the outer surface 132 of the second fixing portion 130. In this case, at least the aforementioned effect (1) is obtainable.

In the aforementioned embodiment, the second extension portion 75 may be eliminated from the second mounting portion 70 of the bracket 50. In this case, the second mounting portion 70 may be constituted by the base portion 72 and the inclination portion 73. In this case, an end portion of the inclination portion 73 is constituted as the engagement portion. For example, the second mounting portion 70 may be constituted as the second mounting portion 700 of the reference example as illustrated in FIG. 12A. In this case, the aforementioned effect (1) is also obtainable. That is, the tensile resultant force Fa is dispersed to be operated to thereby restrain the removal of the bracket 50.

In the aforementioned embodiment, the bracket 50 does not necessarily have symmetry. In this case, the aforementioned effect (1) is also obtainable.

The invention claimed is:

1. A lifting and lowering apparatus lifting and lowering a window glass, comprising:
    a support plate;
    a carrier movably provided at the support plate for lifting and lowering the window glass; and
    a drive mechanism for moving the carrier,
    the drive mechanism including:
        a cable connected to the carrier;
        a drum pulling the cable;
        a pulley guiding the cable; and
        a bracket for mounting the pulley to the support plate,
    the support plate being provided with a pulley arrangement portion at which the pulley is arranged and first and second fixing portions arranged at respective sides of the pulley arrangement portion,
    the first fixing portion being arranged at an outer side of the cable,
    the second fixing portion being arranged at an inner side of the cable,
    the bracket including a body portion at which the pulley is arranged, a first mounting portion mounted to the first fixing portion and a second mounting portion mounted to the second fixing portion,
    the first mounting portion including a first arm portion extending from the body portion and a first extension portion extending from the first arm portion and making contact with an outer surface of the first fixing portion,
    the second mounting portion including a second arm portion extending from the body portion and making contact with an inner surface of the second fixing portion,
    the second mounting portion including the second arm portion and a second extension portion extending from the second arm portion,
    the support plate including a wall portion at an outer side of the second fixing portion, the wall portion contacting the second extension portion of the second mounting portion,
    a void being provided between the second fixing portion and the wall portion,
    a first engagement portion being provided at the outer surface of the first fixing portion,
    a first fitting portion which engages with the first engagement portion being provided at the first extension portion of the first mounting portion,
    one of the first fitting portion or the first engagement portion being a penetration bore, and the other of the first fitting portion or the first engagement portion being a projection.

2. The lifting and lowering apparatus according to claim 1, wherein the wall portion is provided with a second engagement portion,
    the second extension portion of the second mounting portion is provided with a second fitting portion which engages with the second engagement portion.

3. The lifting and lowering apparatus according to claim 1, wherein the support plate is provided with at least one of a first fit portion to which the first mounting portion is fitted and a second fit portion to which the second mounting portion is fitted,
    the first fixing portion serves as a portion of the first fit portion,
    the second fixing portion serves as a portion of the second fit portion.

4. The lifting and lowering apparatus according to claim 1, wherein the first mounting portion is provided with a rib which extends in a longitudinal direction of the first mounting portion,
the second mounting portion is provided with a rib which extends in a longitudinal direction of the second mounting portion.

5. The lifting and lowering apparatus according to claim 1, wherein the bracket includes a line-symmetrical structure with respect to an axis line extending in a direction in which the first mounting portion and the second mounting portion are arranged side by side.

6. The lifting and lowering apparatus according to claim 1, wherein the bracket includes rotational symmetry.

7. The lifting and lowering apparatus according to claim 1, wherein the support plate includes a stopper provided at a lower side of a rotation axis of the pulley for stopping the carrier.

8. A lifting and lowering apparatus lifting and lowering a window glass, comprising:
a support plate;
a carrier movably provided at the support plate for lifting and lowering the window glass; and
a drive mechanism for moving the carrier,
the drive mechanism including:
a cable connected to the carrier;
a drum pulling the cable;
a pulley guiding the cable; and
a bracket for mounting the pulley to the support plate,
the support plate being provided with a pulley arrangement portion at which the pulley is arranged and first and second fixing portions arranged at respective sides of the pulley arrangement portion,
the first fixing portion being arranged at an outer side of the cable,
the second fixing portion being arranged at an inner side of the cable,
the bracket including a body portion at which the pulley is arranged, a first mounting portion mounted to the first fixing portion and a second mounting portion mounted to the second fixing portion,
the first mounting portion including a first arm portion extending from the body portion and a first extension portion extending from the first arm portion and making contact with an outer surface of the first fixing portion,
the second mounting portion including a second arm portion extending from the body portion and making contact with an inner surface of the second fixing portion,
the second mounting portion including the second arm portion and a second extension portion extending from the second arm portion,
the support plate including a wall portion at an outer side of the second fixing portion, the wall portion contacting the second extension portion of the second mounting portion,
a void being provided between the second fixing portion and the wall portion,
the wall portion being provided with a second engagement portion,
the second extension portion of the second mounting portion being provided with a second fitting portion which engages with the second engagement portion,
one of the second fitting portion or the second engagement portion being a penetration bore, and the other of the second fitting portion or the second engagement portion being a projection.

9. The lifting and lowering apparatus according to claim 8, wherein a first engagement portion is provided at the outer surface of the first fixing portion, and
a first fitting portion which engages with the first engagement portion is provided at the first extension portion of the first mounting portion.

10. The lifting and lowering apparatus according to claim 8, wherein the support plate is provided with at least one of a first fit portion to which the first mounting portion is fitted and a second fit portion to which the second mounting portion is fitted,
the first fixing portion serves as a portion of the first fit portion, and
the second fixing portion serves as a portion of the second fit portion.

11. The lifting and lowering apparatus according to claim 8, wherein the first mounting portion is provided with a rib which extends in a longitudinal direction of the first mounting portion, and
the second mounting portion is provided with a rib which extends in a longitudinal direction of the second mounting portion.

12. The lifting and lowering apparatus according to claim 8, wherein the bracket includes a line-symmetrical structure with respect to an axis line extending in a direction in which the first mounting portion and the second mounting portion are arranged side by side.

13. The lifting and lowering apparatus according to claim 8, wherein the bracket includes rotational symmetry.

14. The lifting and lowering apparatus according to claim 8, wherein the support plate includes a stopper provided at a lower side of a rotation axis of the pulley for stopping the carrier.

* * * * *